United States Patent [19]

Keetley et al.

[11] Patent Number: 4,690,614
[45] Date of Patent: Sep. 1, 1987

[54] TORQUE METER

[75] Inventors: Reginald G. Keetley, Daphne, Ala.; Keith Allen, Hollingworth Via Hyde, England

[73] Assignee: Teledyne Industries, Inc., Los Angeles, Calif.

[21] Appl. No.: 794,651

[22] Filed: Nov. 4, 1985

[51] Int. Cl.⁴ .............................................. B64C 11/38
[52] U.S. Cl. ......................................... 416/43; 416/61
[58] Field of Search ..................................... 416/43, 61

[56] References Cited

U.S. PATENT DOCUMENTS

| | | | |
|---|---|---|---|
| 1,952,800 | 3/1934 | Havill | 416/43 X |
| 1,982,170 | 11/1934 | Lansing | 416/43 |
| 2,019,966 | 11/1935 | Havill | 416/43 |
| 2,461,001 | 2/1949 | Palen | 416/43 X |
| 2,766,617 | 10/1956 | Tyler et al. | 416/43 X |
| 2,801,701 | 8/1957 | Coar | 416/43 |
| 3,225,592 | 12/1965 | Greene | 416/43 X |
| 3,253,658 | 5/1966 | Bradley | 416/43 |

FOREIGN PATENT DOCUMENTS

| | | | |
|---|---|---|---|
| 217664 | 11/1957 | Australia | 416/43 |
| 467488 | 6/1937 | United Kingdom | 416/43 |

Primary Examiner—Everette A. Powell, Jr.
Attorney, Agent, or Firm—Gifford, Groh, VanOphem, Sheridan, Sprinkle and Dolgorukov; 44

[57] ABSTRACT

A torque meter is provided for use in conjunction with a layshaft having a forward and rear end and which is rotatably mounted in a housing. The layshaft is axially movable with respect to the housing between a forward and a retracted position while a gearing arrangement in mesh with the layshaft urges the layshaft towards its forward position with a force proportional to the shaft torque. The torque meter comprises a body secured to the housing adjacent the front end of the layshaft which forms a chamber open to the front end of the layshaft while a piston is axially slidably mounted within the chamber. The chamber is pressurized with a fluid, such as oil, which urges the piston against the front end of the layshaft with a force proportional to the pressure so that the piston balances the layshaft against the axial force imposed by the engine. A fluid pressure gauge determines the pressure within the chamber which varies proportionately with the layshaft torque. In addition, a piston ring on the piston opens the fluid chamber to an opening in the body and a passageway in the housing when the layshaft moves to its rearward position, indicative of a negative shaft torque condition, whereupon fluid discharges from the chamber, through the passageway, and activates a control assembly.

10 Claims, 5 Drawing Figures

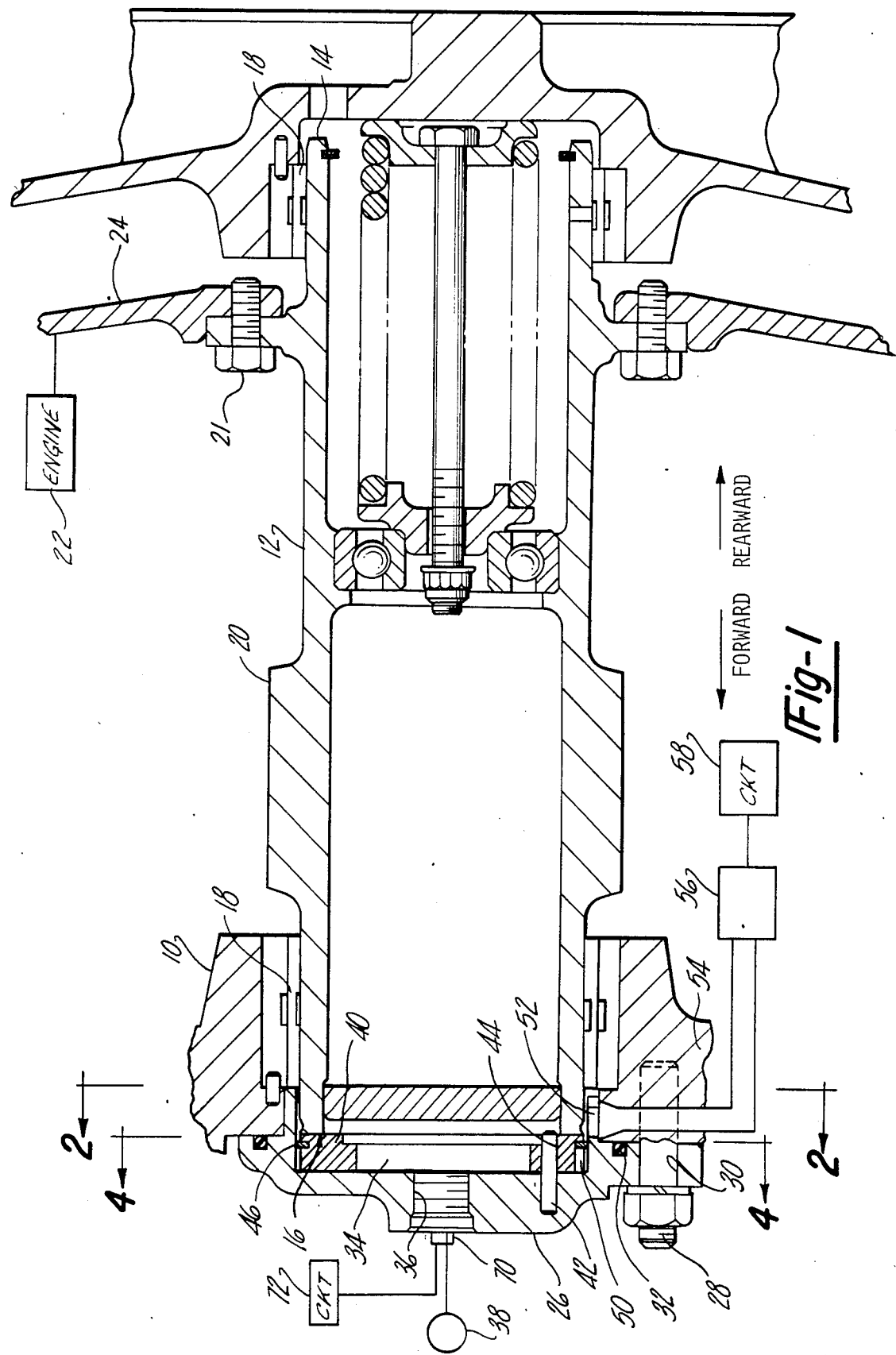

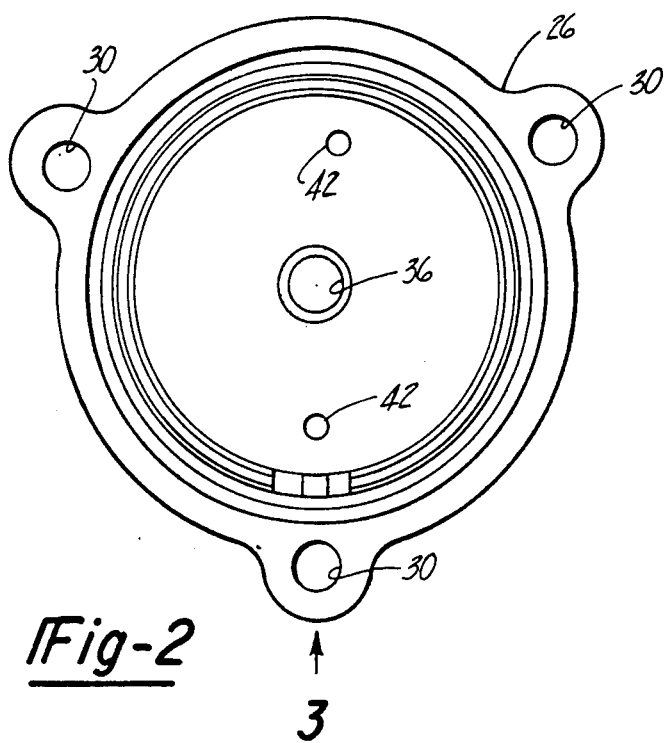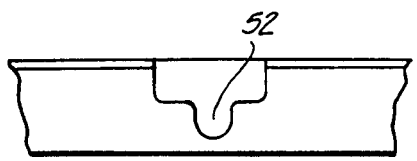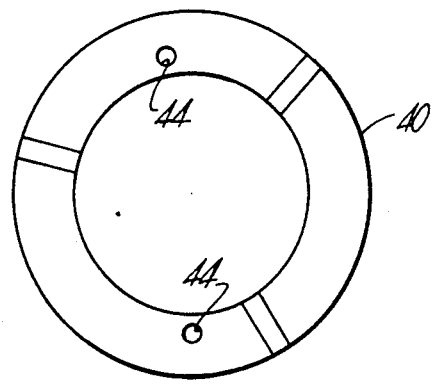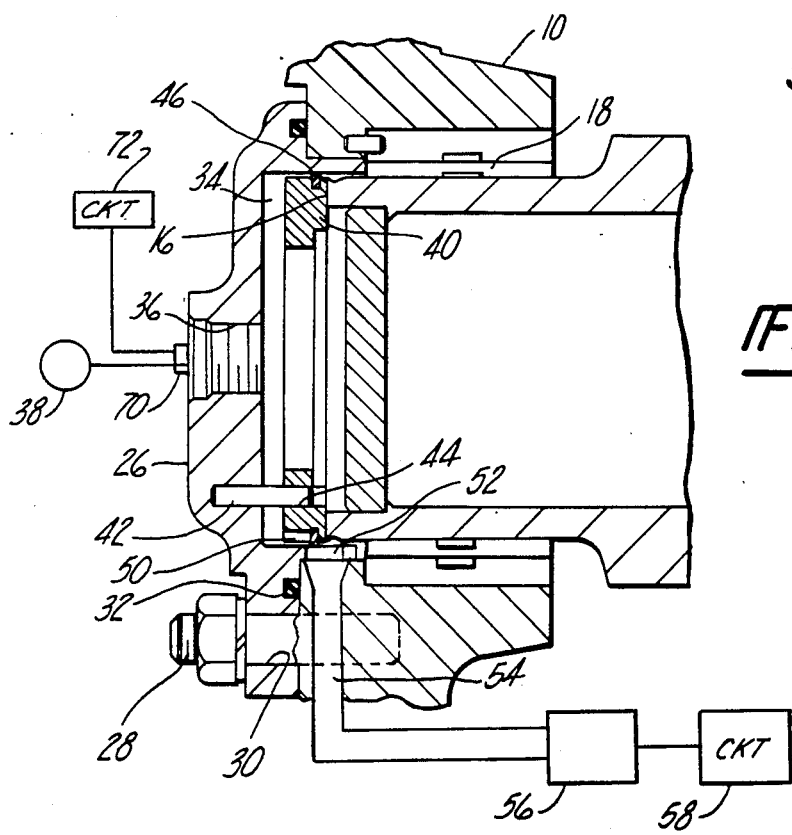

TORQUE METER

BACKGROUND OF THE INVENTION

I. Field of the Invention

The present invention relates generally to torque meters and, more particularly, to a torque meter particularly suited for measuring the torque of the lay shaft for a propeller aircraft engine.

II. Description of the Prior Art

In propeller aircraft engines, the engine rotatably drives the propeller through a gearbox. Within the gearbox assembly a lay shaft is rotatably mounted to the housing by bearing assemblies and includes both a forward and rear end. In addition, the lay shaft is axially movable by a small amount with respect to the housing between a forward and a retracted position.

Typically, the engine is mechanically coupled to the lay shaft through a helical gear arrangement so that, as the positive torque on the lay shaft increases, the lay shaft is axially urged towards its forward position with a force proportional to the shaft torque. In the event of an engine malfunction, however, the propeller, in effect, attempts to rotatably drive the engine rather than vice versa. In doing so, the lay shaft torque reverses thus urging the lay shaft towards its rearward position.

It is important to rapidly detect the occurrence of a negative torque condition since the continuance of a negative torque condition can result in damage to the engine, the propeller and its associated components, as well as the aircraft. Consequently, many of the previously known aircraft engines include means for determining torque and for advising the pilot of the occurrence of the negative torque condition. Such indicators allow the pilot to take precautionary steps in the event of an engine malfunction, such as feathering the propeller.

One disadvantage of previously known systems is that the aircraft, its engine and/or propeller can become excessively damaged even within the relatively short period between the occurrence of the negative torque condition and the corrective action, if any, taken by the pilot.

SUMMARY OF THE PRESENT INVENTION

The present invention provides a fast response, controlled torque meter for a rotating lay shaft, which overcomes the above mentioned disadvantages of the previously known devices.

In brief, the torque meter of the present invention comprises a body secured to the housing adjacent and enclosing the front end of the lay shaft which forms a substantially cylindrical chamber open to the front end of the lay shaft. An annular piston is axially slidably mounted within the chamber and abuts against the front end of the lay shaft.

The chamber is pressurized with a fluid, such as the engine oil, to a pressure such that the piston balances the lay shaft against the axial force imposed on the lay shaft by the helical gear of the engine. Consequently, the pressure within the body chamber is proportional to the torque on the lay shaft. A pressure gauge then measures the pressure in the body chamber and, through a circuit, provides an indication of the lay shaft torque.

The piston includes a piston ring within a groove at one point around its outer periphery which seals the fluid chamber between the piston and housing when the lay shaft is in its forward position. This is the positive mode of operation with the fluid pressure being proportional to positive engine drive torque.

In the event of an engine malfunction, the torque on the lay shaft reverses thus shifting the lay shaft to its rearward position. In doing so, the piston ring opens the fluid chamber to an opening in the body so that fluid discharges from the chamber, through a housing passageway and to the negative torque valve thus activating the valve. Upon activation of the negative torque valve, the valve operates a control circuit which immediately reduces the absolute engine torque, and automatically feathers the propeller.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a longitudinal sectional view illustrating a preferred embodiment of the present invention;

FIG. 2 is a view taken substantially along line 2—2 in FIG. 1 with parts removed for clarity and showing the torquemeter body;

FIG. 3 is a fragmentary view taken substantially along arrow 3 in FIG. 2 and enlarged for clarity;

FIG. 4 is a view taken substantially along line 4—4 in FIG. 1 showing the piston only; and FIG. 5 is a fragmentary view similar to FIG. 1 but illustrating the lay shaft in a negative torque condition.

DETAILED DESCRIPTION OF A PREFERRED EMBODIMENT OF THE PRESENT INVENTION

With reference first to FIG. 1, a preferred embodiment of the torque meter of the present invention is thereshown for use with a propeller aircraft engine. The aircraft includes a gearbox housing 10 and a lay shaft 12. The lay shaft 12 has a rearward end 14 and a forward end 16 and is rotatably mounted in the housing 10 by bearing assemblies 18.

As is well known in the art, the lay shaft includes an external helical gear 20 which drives the output gearing to rotate the propeller and is rotatably driven by an engine 22 through a spur gearing arrangement 24 which is attached to the layshaft by bolts 21 (arrangement 24 illustrated only diagrammatically). Thus, as the torque on the lay shaft 12 from the engine 22 increases, an axial force is imposed on the lay shaft 12 by helical gear loading which is proportional to torque. In addition, the lay shaft 12 is movable between a forward position (FIG. 1) and a retracted position (FIG. 5) and, as the torque from the engine 22 on the lay shaft increases, the lay shaft 12 is urged towards its forward position.

With reference now particularly to FIGS. 1 and 2, the torque meter of the present invention comprises a generally disk shaped body 26 which is secured to the housing 10 by three fasteners 28 (only one shown) which extend through holes 30 formed in the body 26. The body 26 is secured to the housing 10 so that the body 26 is axially spaced from and enclosed the forward end 16 of the lay shaft 12. An O-ring 32 between the housing 10 and the body 26 fluidly seals the body 26 and housing 10 together.

Still referring to FIGS. 1 and 2, the body 26 defines a cylindrical chamber which is open to the front end 16 of the lay shaft 12. A fluid port 36 is formed axially through the body 26 and open to the chamber 34 while a source 38 of fluid pressure is connected to the port 36 and thus to the chamber 34. In the preferred form of the invention, the pressure source 38 comprises an engine oil pump so that the pressure within the chamber 34 is directly proportional to the engine speed.

With reference now particularly to FIGS. 1, 2 and 4, an annular piston 40 is axially slidably mounted within the chamber 34. Two piston alignment pins 42 have one end secured to the body 26 and their other ends slidably positioned through bores 44 in the piston 40. The pins 42 thus prevent rotation of the piston 40 while permitting the piston 40 to axially slide with respect to the lay shaft 12. A piston ring 46 is carried within a groove around the outer periphery of the piston 40 and provides a sealing arrangement between the piston 40 and the outer wall of the chamber 34.

Referring now to FIGS. 3 and 5, a slot 52 at the bottom of the body 26 is opened and closed with respect to the chamber 34 by the axial position of the piston ring 46 depending upon the layshaft 12 position. Normally, when the piston 40 is forward, the slot 52 is closed but in negative torque mode with the layshaft driven rearwardly the slot 52 is opened to chamber 34, thereby dumping chamber pressure. This opening 52 aligns with a fluid passageway 54 formed through the housing 10 which fluidly connects the opening 52 to a valve assembly 56. The valve assembly 56 which is responsive to fluid pressure in the passageway 54 then activates a control circuit 58 for a reason to be subsequently described.

The piston ring 46 ad the body opening 52 are arranged so that, with the piston 40 in its forward position as shown in FIG. 1, the piston ring 46 is forward of the opening 52 thus fluidly disconnecting the housing passageway 54 from the body chamber 34. Conversely, when the piston 40 shifts to its rearward position, as shown in FIG. 5, the piston ring 46 establishes fluid communication between the body chamber 34 and the valve assembly 56 via the fluid passageway 54.

With reference now to FIG. 1, in normal operation the engine 22 drives the lay shaft 12 through the input gearing arrangement 24. As the torque imposed by the engine 22 on the lay shaft 12 increases, the helical engagement between the layshaft gear 20 and the output gear urges the lay shaft 12 forward an amount proportional to the torque due to the resultant pressure balance.

Simultaneously, the engine 22 drives the oil pump 38 which pressurizes the chamber 34 and urges the piston 40 against the forward end 16 of the lay shaft 12. The piston 40 thus balances the lay shaft 12 so that the piston groove 50 does not register with the body opening 52.

The pressure within the body chamber 34 is measured by a pressure gauge 70 and which is indicative of the torque on the lay shaft 12. For example, assuming a constant engine speed, a sudden increase in the torque on the lay shaft 12, via the helical gear 20 urges the lay shaft 12 forward against the piston 40 and, in doing so, increases the pressure within the body chamber 34 an amount proportionate to the torque increase. This increased pressure is detected by the pressure gauge 70, hence provides an indication to the operator or pilot.

Since the oil pump is driven by the engine 22, the pressure output from the oil pump 38 also varies as a function of the engine speed. Consequently, the control circuit 72 monitors the engine speed as an input signal. The control cirucit 72 uses both the engine speed (hence the oil pump 38 pressure) and the pressure in the chamber 34 to control the engine. The control circuit 72 is preferably microprocessor based.

With reference now particularly to FIG. 5, in the event of an engine malfunction, the torque on the lay shaft 12 reverses direction, i.e., the propeller attempts to rotatably drive the engine 22 rather than vice versa. Consequently, due to the torque reversal, the lay shaft 12 axially shifts to its rearward position as shown in FIG. 5. In doing so, the piston ring 46 opens housing passageway 54 to the chamber 34 via the opening 52 in body 26. Flow through the passageway 54 activates the valve assembly 56. The valve assembly 56 then activates the control circuit 58 to immediately reduce the negative torque on the lay shaft 12 by automatically feathering the propeller. In the event that the engine malfunction is subsequently corrected so that the engine 22 again drives the lay shaft 12, instead of vice versa, the lay shaft 12 returns to its forward position (FIG. 1). With the lay shaft 12 in its forward position the chamber 34 and body opening 52 no longer register with each other whereupon normal operation can continue.

From the foregoing, it can be seen that the present invention provides an improved torque meter for a rotating shaft with means for immediately detecting a reversal of shaft torque.

Having described my invention, however, many modifications thereto will become apparent to those skilled in the art to which it pertains without deviation from the spirit of the invention as defined by the scope of the appended claims.

I claim:

1. In an aircraft engine including a torque-experiencing rotating lay shaft, a propeller, and means connecting said propeller to said shaft for driving said propeller, a lay shaft torque meter comprising:
    a forward lay shaft end;
    a housing;
    means for rotatably mounting said lay shaft in said housing;
    means for applying a force to said lay shaft, said force being proportional to the torque experienced by said lay shaft, for axially moving said lay shaft in said housing between a forward lay shaft position and a rearward lay shaft position;
    a body secured to said housing adjacent said forward end of said lay shaft and defining a chamber open to said forward end of said lay shaft;
    a piston slidably mounted in said body abuttable against said forward end of said lay shaft;
    means for pressurizing said chamber;
    means for applying a force to said piston, said force being proportional to the pressure in said chamber, for urging said piston against said forward end of said lay shaft;
    means for venting the pressure from said chamber when said lay shaft moves from said forward lay shaft position and towards said rearward lay shaft position; and
    means for measuring the pressure in said chamber.

2. The invention according to claim 1, further comprising means responsive to said venting means for reducing the torque load on said lay shaft.

3. The invention according to claim 2, wherein said propeller and lay shaft connecting means comprises an output gear mounted on said lay shaft.

4. The invention according to claim 3, wherein said torque reducing means comprises means for feathering said propeller.

5. The invention according to claim 1, wherein said venting means comprises an opening formed through said body, located such that said opening is in communication with said chamber when said lay shaft is in said rearward lay shaft position, and sealed by said piston from communication with said chamber when said lay shaft is in said forward lay shaft position.

6. The invention according to claim 5, further comprising a piston ring disposed between said piston and said body, sliding across said opening upon movement of said piston.

7. The invention as defined in claim 1 wherein said chamber is substantially cylindrical and said piston is annular in shape.

8. The invention as defined in claim 7 and comprising means to prevent rotation of said piston in said chamber.

9. The invention as defined in claim 1 wherein said pressurizing means comprises an oil pump.

10. The invention according to claim 9, further comprising means for driving said oil pump at a speed proportional to the speed of said engine.

* * * * *